United States Patent [19]

Kaneko

[11] Patent Number: 4,737,990
[45] Date of Patent: Apr. 12, 1988

[54] UNAUTHORIZED CHANNEL JAMMING SIGNAL APPLYING METHOD FOR CATV SYSTEM

[75] Inventor: Shohei Kaneko, Tokyo, Japan

[73] Assignee: Pioneer Electronic Corporation, Tokyo, Japan

[21] Appl. No.: 847,784

[22] Filed: Apr. 3, 1986

[30] Foreign Application Priority Data

Apr. 4, 1985 [JP] Japan .................................. 60-71656

[51] Int. Cl.$^4$ ........................................... H04N 7/167
[52] U.S. Cl. .................................. 380/7; 380/6; 380/8; 380/19
[58] Field of Search ............................ 358/118, 121; 179/1.5 M; 380/7, 8, 6, 19

[56] References Cited

U.S. PATENT DOCUMENTS

| | | | |
|---|---|---|---|
| 4,099,203 | 7/1978 | Garodnick | 358/118 |
| 4,434,436 | 2/1984 | Kleykamp et al. | 358/118 |
| 4,521,809 | 6/1985 | Bingham et al. | 358/120 |
| 4,623,918 | 11/1986 | Chomet | 358/118 |

FOREIGN PATENT DOCUMENTS 0153338  9/1984  Japan .................................. 358/118

Primary Examiner—Stephen C. Boczinski
Attorney, Agent, or Firm—Sughrue, Mion, Zinn, Macpeak & Seas

[57] ABSTRACT

In a jamming signal applying device connected between a cable and subscribers' terminal units in a CATV system, a signal for scrambling the video signal is produced in a time sharing mode, with the time sharing period being not uniform, and with sound disturbing long periods being mixedly interposed between picture disturbing short periods.

6 Claims, 2 Drawing Sheets

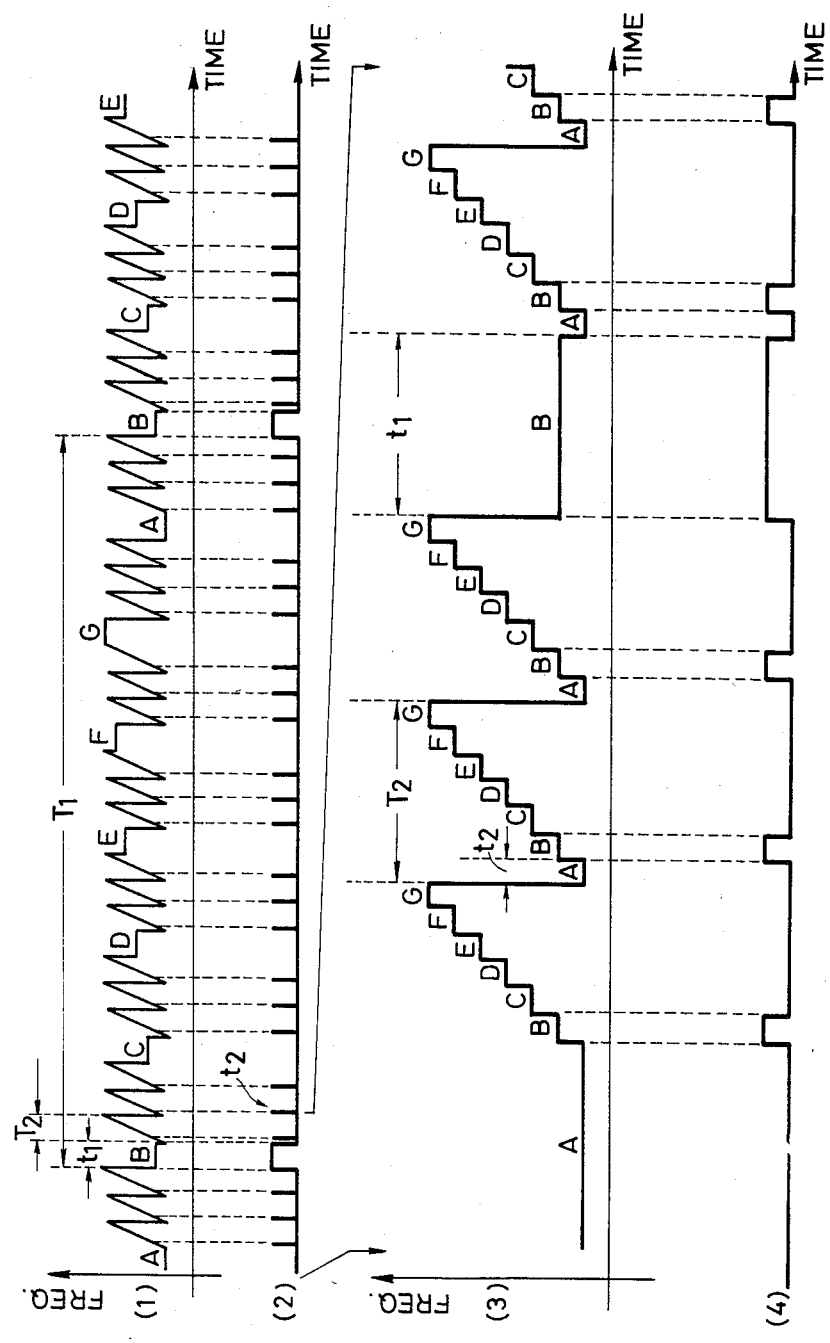

UNAUTHORIZED CHANNEL JAMMING SIGNAL APPLYING METHOD FOR CATV SYSTEM

BACKGROUND OF THE INVENTION

The present invention relates to a CATV (cable television) system, and more particularly to an unauthorized channel jamming signal applying method in a CATV system.

A device for applying a jamming signal to a designated channel, namely, a channel for which viewing is not authorized to a subscriber, in a CATV system which uses cable to transmit video signals is well known in the art. (See, for instance, Japanese Laid-Open Patent Applications Nos. 153338/1984 and 193390/1984). An example of such a conventional unauthorized channel jamming signal applying device is shown in FIG. 1. In FIG. 1, reference numeral 1 designates a main cable line in a CATV system which transmits multi-channel television signals; and 2, the jamming signal applying device. The output of the jamming signal applying device is formed by mixing a jamming signal and a video signal in a mixer, and is applied through output terminals 3, 4, 5 and 6 and respective drop lines to terminal units in CATV subscribers' homes. The multi-channel TV signals transmitted through the main cable line 1 are distributed, for instance, at four points by a distributor 7.

The jamming signal applying device includes a jamming signal generating unit 8 implemented with a voltage-controlled oscillator. The jamming signal generating unit 8 provides an output in response to a control signal voltage from a controller 9. The output voltage of the controller 9 controls the jamming signal's frequency. The controller 9 also controls the on-off operation of RF switches 11, 12, 13 and 14 when a jamming signal produced by the jamming signal generating unit 8 is supplied, via a distributor 10, through the RF switches to the respective output terminals. Specifically, the controller 9 opens the RF switches for the period of time that the jamming is provided for contracted (authorized) channels to prevent the application of the jamming signal to the contracted channels, and the RF switches are closed for the period of time that the jamming signal is provided for noncontracted (unauthorized) channels to allow the application of the jamming signal to the noncontracted channels. Thus, the TV signals provided at the output terminals are scrambled (jammed) or not depending on whether the channels are contracted ones or not.

In the above-described case, the jamming signal is distributed to four points; however, the number of output terminals and the number of RF switches can be increased according to the number of subscribers.

If, in order to obtain the highest degree of scrambling of the picture, the period T of applying the jamming signal is set to a value which is an integer times the horizontal synchronizing frequency, the picture will be strongly affected, but the sound is scarcely scrambled. Accordingly, if this jamming signal applying method is employed, it is necessary to produce another jamming signal to scramble the sound, or else to change the jamming signal so as to better scramble the sound but with the degree of scrambling of the picture decreased. This will be described in more detail.

In the above-described jamming signal applying device, the voltage (or jamming signal frequency) applied to the jamming signal generating unit 8 changes with time as shown in FIG. 2. In FIG. 2, the stair-shaped stages represent jamming channel frequencies (A through G), reference character T designates the period of application of the jamming signal to a channel, and t, the time for which the jamming signal is applied. In the case of FIG. 2, for seven channels to be scrambled, $T/t=7$, and the time sharing period is constant. It should be noted that FIG. 2 shows the operation of one of the RF switches, namely, where the jamming signal is applied to the channel C only. That is, only when the jamming signal frequency is for the channel C is the respective RF switch closed; when the jamming signal frequency is not for the channel C, the RF switch is opened to prevent the application of the jamming signal.

The degree of scrambling of the picture on the subscriber's television set depends on the values of T and t. In general, a higher degree of scrambling is obtained by setting T to a value which is an integer times the horizontal synchronizing frequency of the video signal. On the other hand, t is defined only by T and the number of channels to be jammed.

SUMMARY OF THE INVENTION

Accordingly, an object of the invention is to eliminate the above-described difficulties accompanying a conventional jamming signal applying device.

More specifically, an object of the invention is to provide a jamming signal applying method for a CATV system which can completely scramble both the sound and the picture with only one jamming signal.

The foregoing and other objects of the invention have been achieved by the provision of a selected channel jamming signal applying method for a CATV system in which multi-channel video signals are transmitted through cables, wherein a jamming signal applying device is interposed between the cable and subscribers' terminal units, and in the jamming signal applying device, a jamming signal is produced in a time sharing mode with respect to the video signal, with the time sharing period being nonuniform, and with sound-scrambling long period being interposed between picture-scrambling short periods.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a timing chart indicating an example of the production of a jamming signal according to the jamming signal applying method of the invention.

DESCRIPTION OF THE PREFERRED EMBODIMENTS

Figure 1:
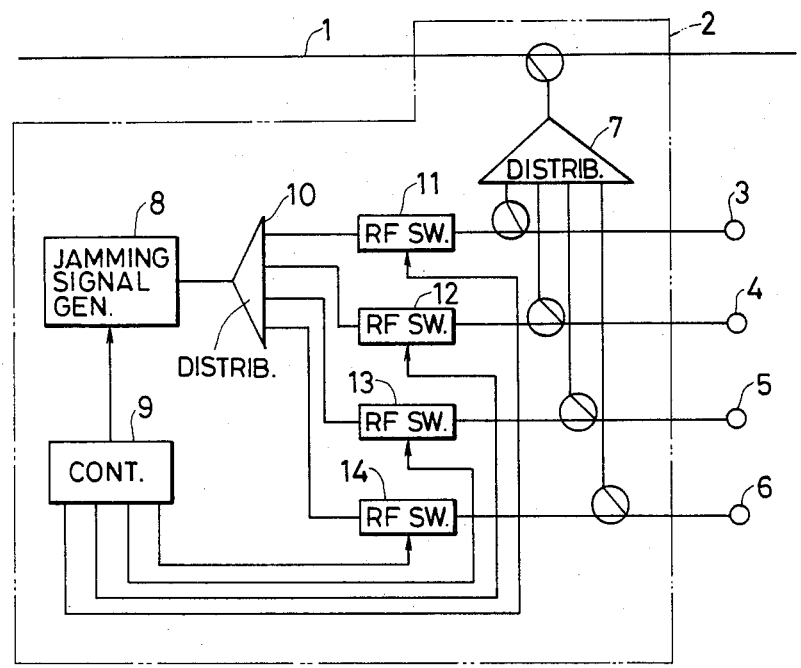
FIG. 1 is a block diagram showing the arrangement of a jamming applying device constructed according to a jamming signal applying method of the invention.
Figure 2:
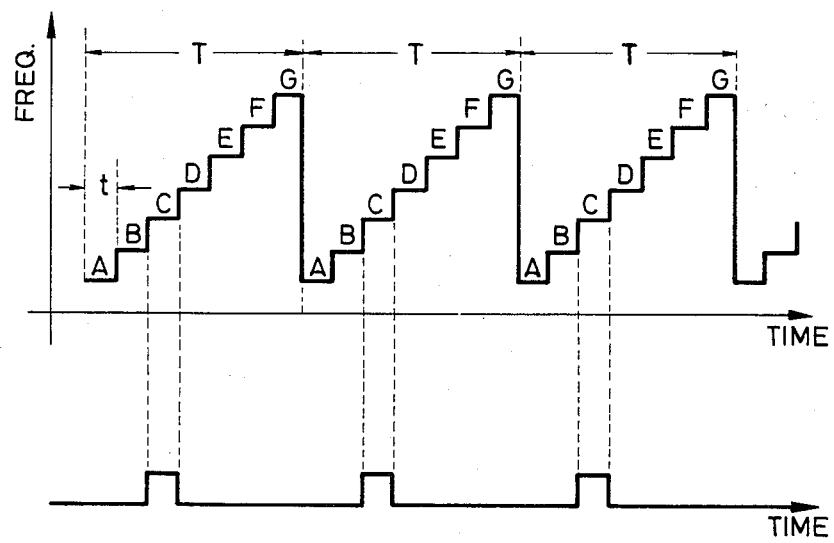
FIG. 2 is a timing chart showing the production of a jamming signal according to a conventional jamming signal applying method.

A preferred embodiment of the invention will be described in detail with reference to FIGS. 1 through 3. In the preferred embodiment, the general arrangement of the jamming signal applying device is the same as that of the above-described conventional device.

The invention resides in the jamming signal generating method illustrated by the diagram of FIG. 3. Waveform (1) in FIG. 3 indicates jamming signal frequencies with time. In the example illustrated, the number of channels to be scrambled is seven. In waveform (1) in FIG. 3, stair-shaped stages represent frequencies, which are spaced in frequency about 50 to 500 KHz from a frequency $f_v$ of a channel to be scrambled. Waveform (2) of FIG. 3 shows the operations of the RF switches. In this case, the jamming signal is applied to the channel B only (that is, the channel B is a noncontracted channel). Waveforms (3) and (4) of FIG. 3 are enlarged diagrams of parts of the waveforms (1) and (2), respectively, the enlarged parts being indicated by arrows.

In FIG. 3, $T_2$ designates the short period of the jamming signal; $T_1$, the long period of the jamming signal; $t_2$, an insertion time with a short period; and $t_1$, an insertion time with a long period. In the case of FIG. 3, the insertion time $t_1$ occurs at intervals of $3T_2$. Since the number of channels to be scrambled is seven, $T_1 = 7(3T_2 + t_1)$.

The short period $T_2$ of the jamming signal is mainly used for scrambling the picture, while the long period $T_1$ is mainly used for scrambling the sound. The long period $T_1$ of the jamming signal is most efffective in scrambling the sound with $1/T_1 = 50$ to 200 Hz, because the lower part of the audio frequency range (20 to 20 KHz) is then rendered noisy. The tonal coloration of the jammed sound is changed by varying $1/T_1$. The volume of the jamming sound depends on $t_1$, that is, the volume is increased by increasing $t_1$ and decreased by decreasing $t_1$.

If the number of channels to be jammed is represented by n and the insertion time $t_1$ occurs at intervals of $mT_2$ (m = 3 in FIG. 3), the following equations can be written:

$$n(t_1 + mT_2) = T_1$$

$$T_2 = nt_2$$

Therefore, m can be obtained according to n, $T_2$, $T_1$ and $t_1$.

Because of the switching speed of readily available RF switches, it is preferable that the insertion time $t_2$ be long and the number of channels n be large. These are contradictory requirements; however, a satisfactory compromise is to make $t_2$ several tens of microseconds and n 10 to 15 channels.

The period $T_2$ is most effective in scrambling pictures when set to a period which is slightly removed from a value an integer times the horizontal synchronizing frequency.

In the above-described embodiment, $t_2$ is set to several tens of microseconds and n is in a range of 10 to 15 channels. However, if high-speed RF switches are employed, then the insertion time $t_2$ can be made shorter and the number of channels n can be made larger. Instead of increasing the number of channels, the picture can be more effectively scrambled. Alternatively, in particular channels only the degree of scrambling can be increased by increasing the jamming signal insertion time. For instance, if the insertion time $t_2$ of the channel B is made twice as long as that of the other channels, the degree of scrambling in the channel B is larger than that in the other channels. When the insertion time $t_1$ of the channel B is made twice as long as that of the other channels, the degree of sound scrambling in the channel B is made larger than that in the other channels. Thus, the picture and sound scrambling degrees can be changed separately for different channels.

As is apparent from the above description, in the system of the invention, the time sharing period of the jamming signal is varied for sound scrambling and picture scrambling. As a result, both the sound and picture can be effectively scrambled with one jamming signal. For this reason, the required circuitry is made simple in construction and low in manufacturing cost.

I claim:

1. In a CATV system in which multi-channel video signals, each of said video signals being made up of an audio portion and a video portion, are transmitted through a cable, a channel jamming signal applying method comprising the steps of:

producing a channel jamming signal containing sound jamming long periods of time $T_1$ for jamming said audio portion and picture jamming short periods of time $T_2$ for jamming said video portion, said channel jamming signal being produced in a time sharing mode with a time sharing period being nonuniform with respect to said sound jamming long periods of time $T_1$ and said picture jamming short periods of time $T_2$, $T_2$ being less than $T_1$ and said periods of time $T_2$ occurring during said periods of time $T_1$; and introducing said jamming signal on a cable line to a subscriber's terminal.

2. The jamming signal applying method of claim 1, wherein said long periods of time $T_1$ have a duration in a range of $T_1 = 1/(50 \text{ Hz})$ to $T_1 1/(200 \text{ Hz})$.

3. The jamming signal applying method of claim 1, wherein said short periods of time $T_2$ are defined by $T_2 = nt_2$, where n is a number of channels to be jammed and $t_2$ is an insertion time of said picture jamming short periods of time, wherein $t_2$ is approximately several tens of microseconds and n is in a range of 10 to 15.

4. The jamming signal applying method of claim 3, wherein $T_2$ is slightly removed from an integer multiple of a horizontal synchronizing frequency of video signals to be jammed.

5. The jamming signal applying method of claim 1, wherein the degree of sound scrambling is increased by increasing $t_1$, an insertion time $t_1$ of said sound jamming long periods of time, said insertion time $t_1$ being an application time of said sound jamming long period of time.

6. The jamming signal applying method of claim 3, wherein the degree of picture scrambling is increased by increasing $t_2$, said insertion time of said picture jamming short periods of time, said insertion time $t_2$ being the application time of said picture jamming short period of time.

* * * * *